United States Patent
Clum et al.

(10) Patent No.: US 11,187,413 B2
(45) Date of Patent: Nov. 30, 2021

(54) DIRT COLLECTOR SYSTEM

(71) Applicant: UNITED TECHNOLOGIES CORPORATION, Farmington, CT (US)

(72) Inventors: Carey Clum, East Hartford, CT (US); Timothy S. Snyder, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 433 days.

(21) Appl. No.: 15/697,219

(22) Filed: Sep. 6, 2017

(65) Prior Publication Data

US 2019/0072033 A1    Mar. 7, 2019

(51) Int. Cl.
*F23R 3/06* (2006.01)
*F23R 3/02* (2006.01)
(Continued)

(52) U.S. Cl.
CPC ............... *F23R 3/06* (2013.01); *F23R 3/002* (2013.01); *F23R 3/02* (2013.01); *B01D 45/08* (2013.01);
(Continued)

(58) Field of Classification Search
CPC .... F23R 3/002; F23R 3/02; F23R 3/04; F23R 3/045; F23R 3/06; F23R 3/50; F02C 7/05; F02C 7/052; F02C 7/12; B64D 2033/0246; B64D 31/06; B64D 33/022; B01D 45/04; B01D 45/06; B01D 45/08; B01D 45/12; B01D 45/16; F05D 2260/203; F05D 2260/607
See application file for complete search history.

(56) References Cited

U.S. PATENT DOCUMENTS 4,296,606 A * 10/1981 Reider ................... F23R 3/002
219/101
5,331,815 A    7/1994 Reinhold, Jr. et al.
(Continued)

FOREIGN PATENT DOCUMENTS

EP    0902166    3/1999
EP    2236760    10/2010
(Continued)

OTHER PUBLICATIONS

European Patent Office, European Search Report dated Jan. 17, 2019 in Application No. 18192485.3.

*Primary Examiner* — Stephanie Sebasco Cheng
(74) *Attorney, Agent, or Firm* — Snell & Wilmer L.L.P.

(57) ABSTRACT

A combustor may comprise a combustion chamber encapsulated by a combustor casing, wherein the combustor casing comprises a casing forward portion, a casing radially inward portion, a casing radially outward portion, and a casing aft portion. The casing radially inward portion may comprise a dirt collector system comprising a hot panel adjacent to the combustion chamber; a cold shell panel coupled to the hot panel such that the hot panel is between the combustion chamber and the cold shell panel; and a dirt collector panel coupled to the cold shell panel such that the cold shell panel is between the hot panel and the dirt collector panel. The cold shell panel and the dirt collector panel at least partially define a dirt collecting space.

10 Claims, 6 Drawing Sheets

(51) Int. Cl.
*F23R 3/00* (2006.01)
*B01D 45/08* (2006.01)

(52) U.S. Cl.
CPC .... *F05D 2260/20* (2013.01); *F05D 2260/607* (2013.01); *F23R 2900/03041* (2013.01); *F23R 2900/03042* (2013.01); *F23R 2900/03043* (2013.01); *F23R 2900/03044* (2013.01)

(56) References Cited

U.S. PATENT DOCUMENTS

| | | | | |
|---|---|---|---|---|
| 8,683,814 B2* | 4/2014 | Xu | ............ | F01D 5/186 |
| | | | | 415/115 |
| 8,727,714 B2* | 5/2014 | Snider | ............ | F01D 25/12 |
| | | | | 415/178 |
| 9,453,767 B2* | 9/2016 | DeSilva | ............ | G01K 11/24 |
| 10,400,795 B2* | 9/2019 | Mook | ............ | F02C 6/08 |
| 2006/0059913 A1 | 3/2006 | Ebthke et al. | | |
| 2012/0121381 A1* | 5/2012 | Charron | ............ | F01D 9/023 |
| | | | | 415/115 |
| 2015/0377074 A1 | 12/2015 | de Diego et al. | | |

FOREIGN PATENT DOCUMENTS

| | | |
|---|---|---|
| EP | 2995864 | 3/2016 |
| EP | 3048370 | 7/2016 |
| GB | 2061482 | 5/1981 |

\* cited by examiner

DIRT COLLECTOR SYSTEM

FIELD

This disclosure generally relates a dirt collector system in an engine.

BACKGROUND

Aircraft may fly in environments in which the air contains significant concentrations of particulate matter, such as dirt particles. The dirt particles may flow into the core of a gas turbine engine of an aircraft with the airflow intake. However, the presence of foreign bodies such as particulate may cause harm to various components of a gas turbine engine.

SUMMARY

In various embodiments, a combustor may comprise a combustion chamber encapsulated by a combustor casing, wherein the combustor casing comprises a casing forward portion, a casing radially inward portion, a casing radially outward portion, and a casing aft portion. The casing radially inward portion may comprise a dirt collector system comprising a hot panel adjacent to the combustion chamber; a cold shell panel coupled to the hot panel such that the hot panel is between the combustion chamber and the cold shell panel; and a dirt collector panel coupled to the cold shell panel such that the cold shell panel is between the hot panel and the dirt collector panel. The cold shell panel and the dirt collector panel at least partially define a dirt collecting space.

In various embodiments, the dirt collector panel may comprise a dirt collector hole disposed through a forward portion of the dirt collector panel, wherein the dirt collector hole may span a first length through the dirt collector panel substantially perpendicular to the cold shell panel such that an airflow may flow through the dirt collector hole, into the dirt collecting space, and contact a shell forward portion of the cold shell panel. In various embodiments, the cold shell panel may comprise a cooling hole disposed through a shell aft portion of the cold shell panel, wherein the cooling hole may span a second length substantially perpendicular to the hot panel such that the airflow may flow through the cooling hole and contact a hot panel aft portion of the hot panel. In various embodiments, the first length of the dirt collector hole may span along a different line than the second length of the cooling hole, such that the dirt collector hole and the cooling hole are in misalignment.

In various embodiments, the dirt collector hole may comprise a dirt collector hole diameter, wherein the dirt collecting space may be a maximum of four times greater than the dirt collector hole diameter. In various embodiments, the cooling hole may comprise a cooling hole diameter, wherein the dirt collector hole may comprise a dirt collector hole diameter, and wherein the dirt collector hole diameter may be larger than the cooling hole diameter. In various embodiments, the dirt collector hole diameter may be between one and five times larger than the cooling hole diameter. In various embodiments, the hot panel may comprise a hot panel hole through the hot panel aft portion of the hot panel, wherein the hot panel hole may span a third length through the hot panel. In various embodiments, the second length of the cooling hole may span along a different line than the third length of the hot panel hole, such that the cooling hole and the hot panel hole are in misalignment.

In various embodiments, a combustor may comprise a combustion chamber encapsulated by a combustor casing, wherein the combustor casing comprises a casing forward portion, a casing radially inward portion, a casing radially outward portion, and a casing aft portion. The casing forward portion may comprise a dirt collector system, comprising a hot bulkhead panel adjacent to the combustion chamber; a cold bulkhead panel coupled to the hot bulkhead panel such that the hot bulkhead panel is between the combustion chamber and the cold bulkhead panel; and a bulkhead dirt collector panel coupled to the cold bulkhead panel such that the cold bulkhead panel is between the hot bulkhead panel and the bulkhead dirt collector panel, wherein the cold bulkhead panel and the bulkhead dirt collector panel at least partially define a bulkhead dirt collecting space.

In various embodiments, the bulkhead dirt collector panel may comprise a dirt collector hole through the bulkhead dirt collector panel in a radially inward portion of the bulkhead dirt collector panel, wherein the dirt collector hole may span a first length substantially perpendicular to the cold bulkhead panel such that an airflow may flow through the dirt collector hole, into the bulkhead dirt collecting space, and contact a cold panel radially inward portion of the cold bulkhead panel. In various embodiments, the cold bulkhead panel may comprise a bulkhead cooling hole through a cold panel radially outward portion of the cold bulkhead panel, wherein the bulkhead cooling hole may span a second length substantially perpendicular to the hot bulkhead panel such that the airflow may flow through the bulkhead cooling hole and contact a hot panel radially outward portion of the hot bulkhead panel. In various embodiments, the first length of the dirt collector hole may span along a different line than the second length of the bulkhead cooling hole, such that the dirt collector hole and the bulkhead cooling hole are in misalignment.

In various embodiments, the dirt collector hole may comprise a dirt collector hole diameter, wherein the bulkhead dirt collecting space is between 0.5 and 2 times the size of the dirt collector hole diameter. In various embodiments, the bulkhead cooling hole may comprise a bulkhead cooling hole diameter, wherein the dirt collector hole may comprise a dirt collector hole diameter, and wherein the dirt collector hole diameter may be larger than the bulkhead cooling hole diameter. In various embodiments, the dirt collector hole diameter may be between one and five times larger than the bulkhead cooling hole diameter. In various embodiments, the bulkhead dirt collector panel may comprise a plurality of dirt collector holes, and the cold bulkhead panel may comprise a plurality of bulkhead cooling holes, and wherein the number of dirt collector holes may be about 17 percent of the number of bulkhead cooling holes. In various embodiments, the radially inward portion of the bulkhead dirt collector panel may be radially adjacent to a bulkhead dirt collector panel fuel hole disposed through the bulkhead dirt collector panel.

In various embodiments, a gas turbine engine may comprise a combustor comprising a combustion chamber encapsulated by a combustor casing, wherein the combustor casing comprises a casing forward portion, a casing radially inward portion, a casing radially outward portion, and a casing aft portion. The casing radially inward portion comprises a dirt collector system, which may comprise a hot panel adjacent to the combustion chamber; a cold shell panel coupled to the hot panel such that the hot panel is between the combustion chamber and the cold shell panel; and a dirt collector panel coupled to the cold shell panel such that the cold shell panel is between the hot panel and the dirt collector panel, wherein the cold shell panel and the dirt collector panel at least partially define a dirt collecting space. In various embodiments, the dirt collector panel may comprises a dirt collector hole disposed through a forward portion of the dirt collector panel, wherein the dirt collector hole may span a first length substantially perpendicular to the cold shell panel such that an airflow may flow through the dirt collector hole, into the dirt collecting space, and contact a shell forward portion of the cold shell panel. In various embodiments, the cold shell panel may comprise a cooling hole through a shell aft portion of the cold shell panel, wherein the cooling hole may span a second length substantially perpendicular to the hot panel such that the airflow may flow through the cooling hole and contact a hot panel aft portion of the hot panel. In various embodiments, the first length of the dirt collector hole may span along a different line than the second length of the cooling hole, such that the dirt collector hole and the cooling hole are in misalignment.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
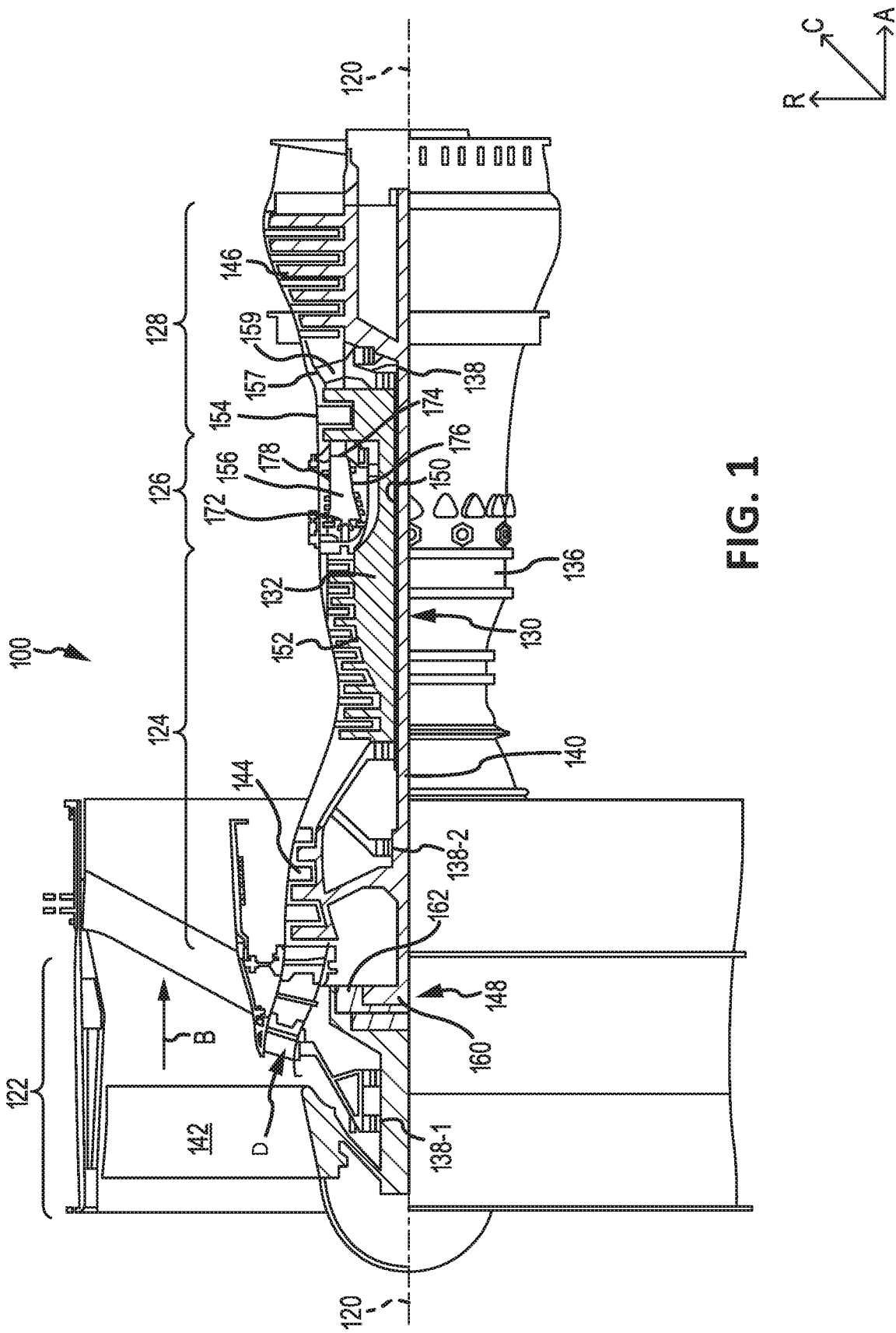
FIG. 1 illustrates a gas turbine engine, in accordance with various embodiments.

In various embodiments, and with reference to FIG. 1, a gas turbine engine 100 is disclosed. As used herein, "aft" refers to the direction associated with a tail (e.g., the back end) of an aircraft, or generally, to the direction of exhaust of gas turbine engine 100. As used herein, "forward" refers to the direction associated with a nose (e.g., the front end) of the aircraft, or generally, to the direction of flight or motion. An A-R-C axis has been included to illustrate the axial (A), radial (R) and circumferential (C) directions. For clarity, axial axis A spans parallel to axis of rotation 120. As utilized herein, radially inward refers to the negative R direction towards axis of rotation 120, and radially outward refers to the R direction away from axis of rotation 120.

Gas turbine engine 100 may comprise a two-spool turbofan that generally incorporates a fan section 122, a compressor section 124, a combustor section 126, and a turbine section 128. Gas turbine engine 100 may also comprise, for example, an augmenter section, and/or any other suitable system, section, or feature. In operation, fan section 122 may drive air along a bypass flow-path B, while compressor section 124 may further drive air along a core flow-path D for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 100 may comprise a low speed spool 130 and a high speed spool 132 mounted for rotation about an axis of rotation 120 relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. Combustor 156 may comprise a combustion chamber encapsulated by a combustor casing. The combustor casing may comprise a casing forward portion 172, a casing aft portion 174, a casing radially inward portion 176, and a casing radially outward portion 178. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about axis of rotation 120. As used herein, a "high pressure" compressor and/or turbine may experience a higher pressure than a corresponding "low pressure" compressor and/or turbine.

In various embodiments, the air along core airflow D may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path D. Low pressure turbine 146 and high pressure turbine 154 may rotationally drive low speed spool 130 and high speed spool 132, respectively, in reaction to the expansion exhaust gases.

In various embodiments, gas turbine engine 100 may comprise a high-bypass ratio geared aircraft engine. The bypass ratio of gas turbine engine 100 may also be greater than ten (10:1). Geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about five (5). The diameter of fan 142 may be significantly larger than that of the low pressure compressor section 144, and the low pressure turbine 146 may have a pressure ratio that is greater than about five (5:1). The pressure ratio of low pressure turbine 146 is measured prior to inlet of low pressure turbine 146 as related to the pressure at the outlet of low pressure turbine 146. It should be understood, however, that the above parameters are exemplary of various embodiments of a suitable geared architecture engine and that the present disclosure contemplates other turbine engines including direct drive turbofans.

Figure 2:
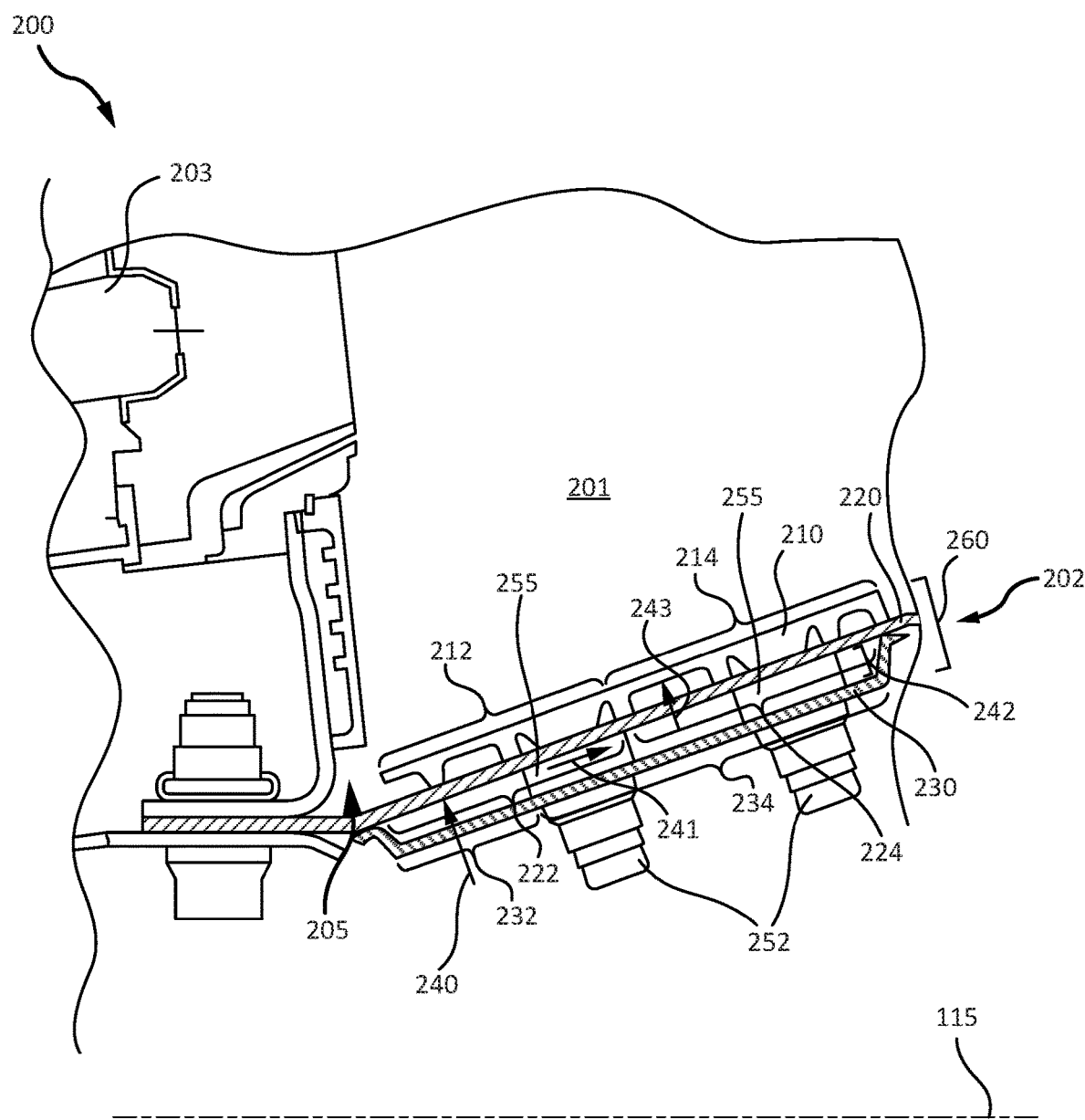
FIG. 2 illustrates a radially inward portion of a combustor of a gas turbine engine, in accordance with various embodiments.

In various embodiments, with reference to FIG. 2, a combustor 200 (an example of combustor 156 in FIG. 1) may comprise combustion chamber 201 encapsulated by a combustor casing (not fully depicted, but an example of the combustor casing depicted in FIG. 1 comprising casing forward portion 172, casing aft portion 174, casing radially inward portion 176, and casing radially outward portion). The combustor casing may comprise a casing forward portion 205 (i.e., a bulkhead portion), a casing aft portion, a casing radially inward portion 202 spanning between casing forward portion 205 and the casing aft portion, and a casing radially outward portion (not depicted) spanning between casing forward portion 205 and the casing aft portion and radially outward of casing radially inward portion 202. Casing forward portion 205 may be disposed proximate a fuel nozzle 203 through which fuel may be injected into the combustion chamber 201 to be mixed with airflow and combusted. In reference to FIG. 2, radial directions and dispositions of components are relative to axis 115, which may be parallel to axis of rotation 120 depicted in FIG. 1.

As described herein, airflow may travel into combustion chamber 201 to be mixed with fuel and combusted. Particulate from the environment in which an aircraft is flying may travel in and around combustor 200. To prevent the dirt from entering the combustion chamber 201, casing radially inward portion 202 of the combustor casing may comprise a dirt collector system 260. Dirt collector system 260 may comprise a hot panel 210 adjacent to combustion chamber 201. Hot panel 210 may be directly exposed to the heat created during fuel combustion within combustion chamber 201. Dirt collector system 260 may further comprise a cold shell panel 220 coupled to hot panel 210. Cold shell panel 220 may be coupled to hot panel 210 radially inward of hot panel 210 such that hot panel 210 is between combustion chamber 201 and cold shell panel 220. Dirt collector system 260 may further comprise a dirt collector panel 230 coupled to cold shell panel 220. Dirt collector panel 230 may be coupled to cold shell panel 220 radially inward of cold shell panel 220 such that cold shell panel 220 is between hot panel 210 and dirt collection panel 230. In various embodiments, there may be a space between hot panel 210 and cold shell panel 220, and a dirt collecting space 242 between cold shell panel 220 and dirt collector panel 230. Hot panel 210, cold shell panel 220, and dirt collector panel 230 may be coupled together by studs 252. Washers 255 may be disposed between cold shell panel 220 and dirt collector panel 230 along studs 252. The width of washers 255 may determine the size of dirt collecting space 242 (i.e., the distance between dirt collector panel 230 and cold shell panel 220).

Figure 3A:
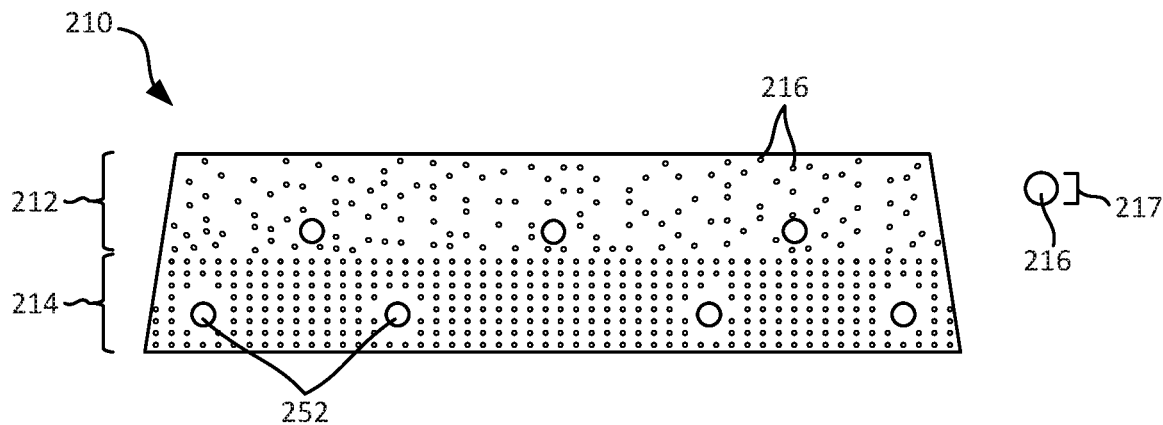
FIG. 3A illustrates a perspective view of a hot panel of a combustor of a gas turbine engine, in accordance with various embodiments.

With combined reference to FIGS. 2 and 3A, hot panel 210 may comprise studs 252 protruding from hot panel 210 radially inward. Hot panel 210 may comprise a hot panel forward portion 212 and a hot panel aft portion 214. Hot panel 210 may comprise hot panel holes 216, the length of which may span through hot panel 210 between combustion chamber 201 and the space between hot panel 210 and cold shell panel 220, substantially perpendicular to cold shell panel 220 (as used in this context only "substantially" means within plus or minus 20% from perpendicular). Hot panel holes 216 may be disposed through any suitable portion of hot panel 210. In various embodiments, there may be a greater number of hot panel holes 216 per unit of surface area comprising hot panel holes 216 through hot panel aft portion 214 than through hot panel forward portion 212, or vice versa. In various embodiments, there may be no hot panel holes 216 through hot panel forward portion 212 and/or hot panel aft portion 214. In various embodiments, hot panel holes 216 may have a diameter 217 of between 0.020 and 0.030 inch (0.05 and 0.08 cm), 0.023 and 0.027 inch (0.058 and 0.069 cm), 0.020 and 0.025 inch (0.05 and 0.06 cm), and/or 0.025 and 0.030 inch (0.06 and 0.08 cm). In various embodiments, hot panel holes 216 may vary in size.

Figure 3B:
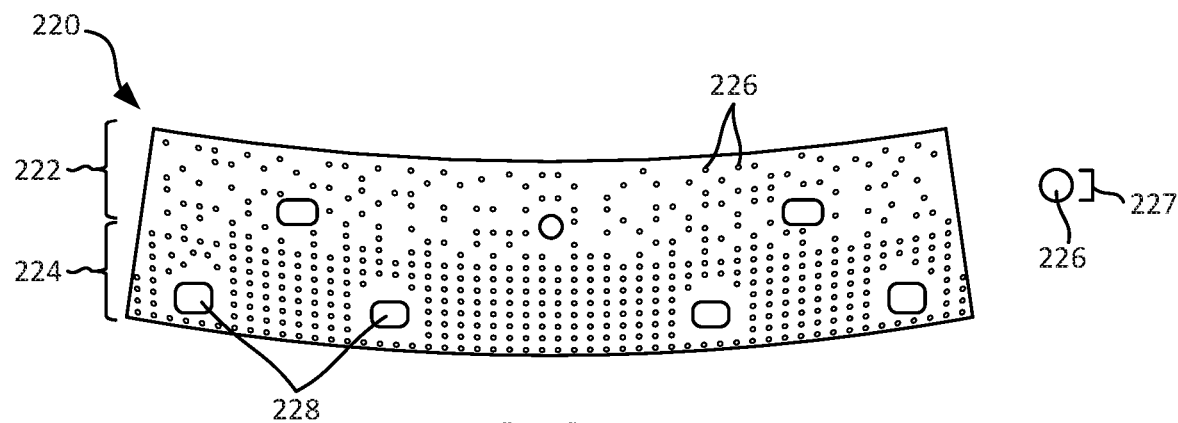
FIG. 3B illustrates a perspective view of a cold shell panel of a combustor of a gas turbine engine, in accordance with various embodiments.
Figure 3C:
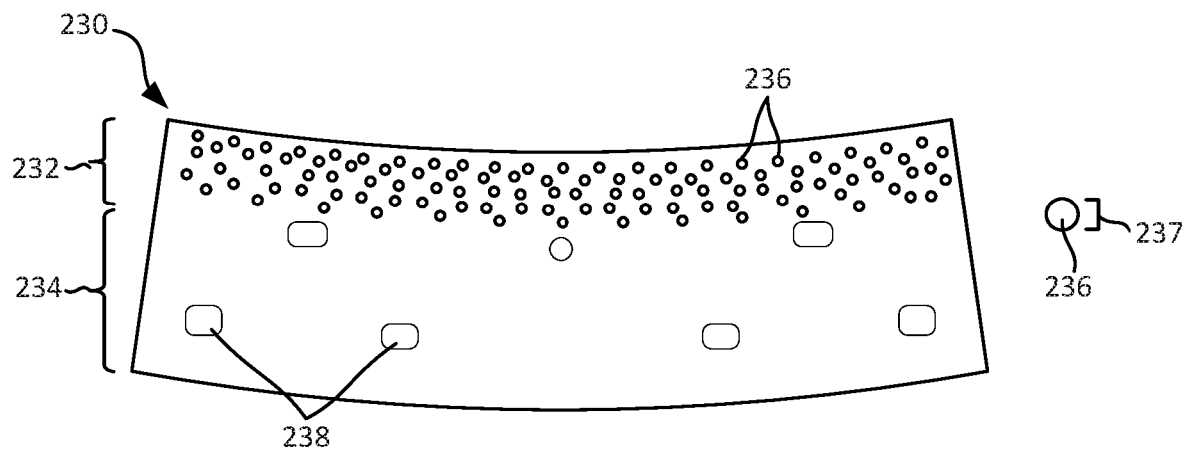
FIG. 3C illustrates a perspective view of a dirt collector panel of a combustor of a gas turbine engine, in accordance with various embodiments.

With combined reference to FIGS. 2, 3A, and 3B, cold shell panel 220 may comprise stud holes 228 through which studs 252 may be disposed. Cold shell panel 220 may comprise a shell forward portion 222 and a shell aft portion 224. Cold shell panel 220 may comprise cooling holes 226, the length of which may span through cold shell panel 220 between the space between hot panel 210 and cold shell panel 220 and dirt collecting space 242, substantially perpendicular to hot panel 210 (as used in this context only "substantially" means within plus or minus 20% from perpendicular). Cooling holes 226 may be disposed through any suitable portion of cold shell panel 220. In various embodiments, there may be a greater number of cooling holes 226 per unit of surface area comprising cooling holes 226 through shell aft portion 224 than through shell forward portion 222, or vice versa. In various embodiments, there may be no cooling holes 226 through shell forward portion 222 and/or shell aft portion 224. In various embodiments, cooling holes 226 may have a diameter 227 of between 0.020 and 0.030 inch (0.05 and 0.08 centimeter (cm)), 0.023 and 0.027 inch (0.058 and 0.069 cm), 0.020 and 0.025 inch (0.05 and 0.06 cm), and/or 0.025 and 0.030 inch (0.06 and 0.08 cm). In various embodiments, cooling holes 226 may vary in size.

In various embodiments, the length of cooling holes 226 may be along a line different than hot panel holes 216 such that cooling holes 226 do not align with hot panel holes 216 (i.e., cooling holes 226 and hot panel holes 216 are in misalignment). Therefore, any airflow (e.g., airflow 243) traveling through cooling holes 226 may contact hot panel 210, on which any dirt or particulate in the airflow may collect, before the airflow is redirected through hot panel holes 216 to cool hot panel 210 and/or combustion chamber 201. In various embodiments, hot panel 210 may have substantially the same number of hot panel holes 216 as cold shell panel 220 has cooling holes 226 (when used in this context only, "substantially" means within plus or minus 20% of the number of holes).

With combined reference to FIGS. 2 and 3A-3C, dirt collector panel 230 may comprise stud holes 238 through which studs 252 may be disposed. Dirt collector panel 230 may comprise a forward portion 232 and an aft portion 234. Dirt collector panel 230 may comprise dirt collector holes 236, the length of which may span through dirt collector panel 230 between dirt collecting space 242 and a space exterior to (i.e., radially inward of) dirt collector panel 230, substantially perpendicular to cold shell panel 220 (as used in this context only "substantially" means within plus or minus 20% from perpendicular). Dirt collector holes 236 may be disposed through any suitable portion of dirt collector panel 230. In various embodiments, there may be a fewer number of dirt collector holes 236 per unit of surface area comprising dirt collector holes 236 through aft portion 234 than through forward portion 232, or vice versa. In various embodiments, there may be no dirt collector holes 236 on aft portion 234 and/or forward portion 232.

In embodiments in which dirt collector panel 230 comprises more dirt collector holes 236 through forward portion 232 than aft portion 234, and cold shell panel 220 comprises more cooling holes 226 through shell aft portion 224 than shell forward portion 222, this disposition of dirt collector holes 236 and cooling holes 226 tends to minimize the probability that airflow 240 flowing through dirt collector holes 236 will flow through dirt collector holes 236, through dirt collecting space 242, and subsequently through cooling holes 226 without first contacting the radially inward surface of cold shell panel 220. Therefore, any particulate or dirt in airflow 240 may collect on cold shell panel 220 in dirt collecting space 242 before airflow 240 flows through cooling holes 226 and subsequently through hot panel holes 216. In furtherance of encouraging the collection of dirt from airflow 240 on cold shell panel 220 after flowing through dirt collector holes 236, in various embodiments, the length of dirt collector holes 236 may be along a line different than cooling holes 226 such that dirt collector holes 236 do not align with cooling holes 226 (i.e., dirt collector holes 236 and cooling holes 226 are in misalignment). Therefore, again, airflow 240 traveling through dirt collector holes 236 may contact cold shell panel 220, on which any dirt or particulate in airflow 240 may collect, before airflow 240 is redirected in dirt collecting space 242 (airflow 241, for example) to flow through cooling holes 226 (the majority of which may be through shell aft portion 224, as shown by airflow 243) toward hot panel 210 and/or combustion chamber 201.

In various embodiments, dirt collector holes 236 may have a diameter 237 larger than diameter 227 of cooling holes 226 and/or diameter 217 of hot panel holes 216. In various embodiments, dirt collector holes 236 may have a diameter of between 1 and 5 times, 1 and 4 times, 2 and 4 times, or 1 and 3 times the diameter of cooling holes 226 and/or hot panel holes 216. In various embodiments, diameter 237 of dirt collector holes 236 may be between 0.1 and 0.13 inch (0.25 and 0.33 cm), 0.1 and 0.15 inch (0.25 and 0.38 cm), 0.03 and 0.11 inch (0.08 and 0.28 cm), 0.05 and 0.11 inch (0.13 and 0.28 cm), and/or 0.08 and 0.11 inch (0.2 and 0.28 cm). In various embodiments, dirt collector holes 236 may vary in size. In various embodiments, dirt collector panel 230 may have about 17% the number of dirt collector holes 236 as hot panel 210 has hot panel holes 216 and/or cold shell panel 220 has cooling holes 226 (when used in this context only, "about" means within plus or minus 10%). In various embodiments, the size of dirt collecting space 242 may be a maximum of four times greater than diameter 237 of dirt collector holes 236 (the size of dirt collecting space 242 is referring to the distance between cold shell panel 220 and dirt collector panel 230).

In various embodiments, hot panel holes 216, cooling holes 226, and/or dirt collector holes 236 may not be circular, but may be any suitable shape such as oval, rectangular, square, hexagonal or the like. In such cases, the relative sizes of hot panel holes 216, cooling holes 226, and/or dirt collector holes 236 may be determined by a width, length, and/or height of the shape.

Figure 4:
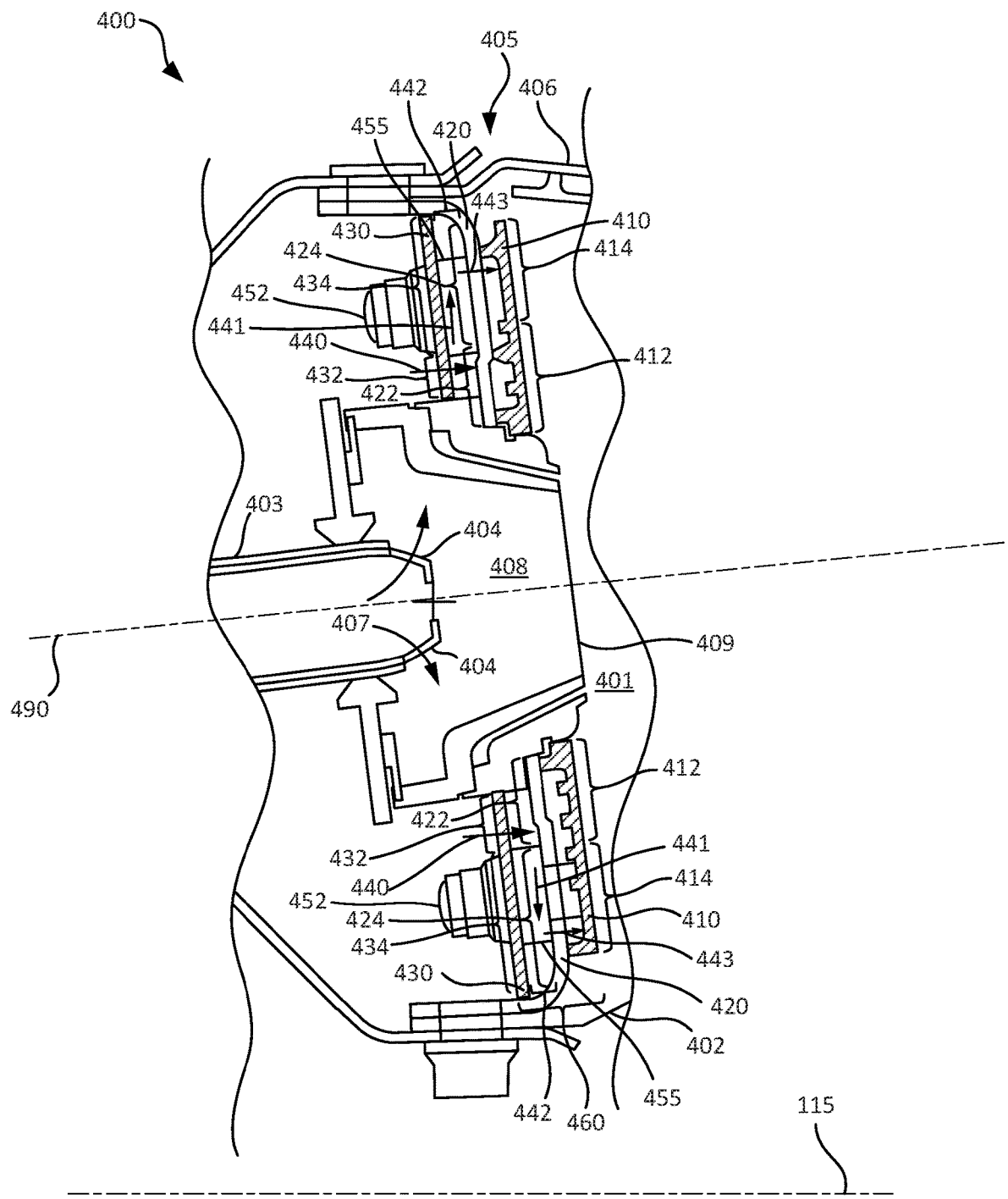
FIG. 4 illustrates a forward portion of a combustor of a gas turbine engine, in accordance with various embodiments.

In various embodiments, with reference to FIG. 4, a combustor 400 (an example of combustor 156 in FIG. 1), only partially depicted in FIG. 4, may comprise combustion chamber 401 encapsulated by a combustor casing (not fully depicted, but an example of the combustor casing depicted in FIG. 1 comprising casing forward portion 172, casing aft portion 174, casing radially inward portion 176, and casing radially outward portion). The combustor casing may comprise a casing forward portion 405 (i.e., a bulkhead portion), a casing aft portion, a casing radially inward portion 402 (relative to axis 115 which may be parallel to axis of rotation 120) spanning between casing forward portion 405 and the casing aft portion, and a casing radially outward portion 406 spanning between casing forward portion 405 and the casing aft portion and radially outward of casing radially inward portion 402 (relative to axis 115 which may be parallel to axis of rotation 120). Casing forward portion 405 may be disposed proximate a fuel nozzle 403 comprising fuel inlets 404, through which fuel 407 may be injected into a swirling chamber 408, and subsequently into the combustion chamber 401 through fuel hole 409 to be mixed with airflow and combusted.

As described herein, airflow may travel into combustion chamber 401 to be mixed with fuel and combusted. Particulate, or dirt, from the environment in which an aircraft is flying may travel in and around combustor 400. To prevent the dirt from entering the combustion chamber 401, casing forward portion 405 of the combustor casing may comprise a dirt collector system 460. Radial directions and dispositions of components of dirt collector system 460 are described relative to axis 490.

Dirt collector system 460 may comprise a hot bulkhead panel 410 adjacent to, and forward of, combustion chamber 401. Hot bulkhead panel 410 may be directly exposed to the heat created during fuel combustion within combustion chamber 401. Dirt collector system 460 may further comprise a cold bulkhead panel 420 coupled to hot bulkhead panel 410. Cold bulkhead panel 420 may be coupled to hot bulkhead panel 410 forward of hot bulkhead panel 410 such that hot bulkhead panel 410 is between combustion chamber 401 and cold bulkhead panel 420. Dirt collector system 460 may further comprise a bulkhead dirt collector panel 430 coupled to cold bulkhead panel 420. Bulkhead dirt collector panel 430 may be coupled to cold bulkhead panel 420 forward of cold bulkhead panel 420 such that cold bulkhead panel 420 is between hot bulkhead panel 410 and bulkhead dirt collector panel 430. In various embodiments, there may be a space between hot bulkhead panel 410 and cold bulkhead panel 420, and a bulkhead dirt collecting space 442 between cold bulkhead panel 420 and bulkhead dirt collector panel 430. Hot bulkhead panel 410, cold bulkhead panel 420, and bulkhead dirt collector panel 430 may be coupled together by studs 452. Washers 455 may be disposed between cold bulkhead panel 420 and bulkhead dirt collector panel 430 along studs 452, which may determine the size of bulkhead dirt collecting space 442 (i.e., the distance between bulkhead dirt collector panel 430 and cold bulkhead panel 420).

Figure 5A:
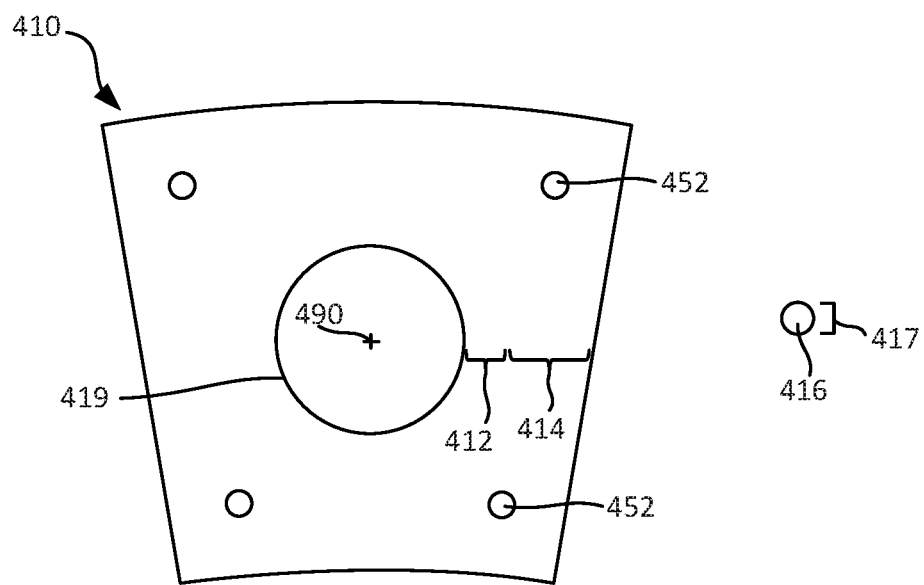
FIG. 5A illustrates a perspective view of a hot bulkhead panel of a combustor of a gas turbine engine, in accordance with various embodiments.

With combined reference to FIGS. 4 and 5A, hot bulkhead panel 410 may comprise studs 452 protruding forward from hot bulkhead panel 410. Hot bulkhead panel 410 may further comprise a fuel hole 419 through which fuel 407 from fuel nozzle 403 may pass from swirling chamber 408 to combustion chamber 401. Hot bulkhead panel 410 may comprise a hot panel radially inward portion 412 radially adjacent to fuel hole 419, and a hot panel radially outward portion 414. Hot bulkhead panel 410 may comprise hot bulkhead panel holes 416 (not pictured on hot bulkhead panel 410 in FIG. 5A), the length of which may span through hot bulkhead panel 410 between the combustion chamber 401 and the space between hot bulkhead panel 410 and cold bulkhead panel 420, substantially perpendicular to cold bulkhead panel 420 (as used in this context only "substantially" means within plus or minus 20% from perpendicular). Hot bulkhead panel holes 416 may be disposed through any suitable portion of hot bulkhead panel 410. In various embodiments, there may be a greater number of hot bulkhead panel holes 416 per unit of surface area comprising hot bulkhead panel holes 416 through hot panel radially outward portion 414 than through hot panel radially inward portion 412, or vice versa. In various embodiments, there may be no hot bulkhead panel holes 416 through hot panel radially inward portion 412 and/or hot panel radially outward portion 414, or no hot bulkhead panel holes 416 through hot bulkhead panel 410 at all. In various embodiments, hot panel holes may have a diameter 417 of between 0.020 and 0.030 inch (0.05 and 0.08 cm), 0.023 and 0.027 inch (0.058 and 0.069 cm), 0.020 and 0.025 inch (0.05 and 0.06 cm), and/or 0.025 and 0.030 inch (0.06 and 0.08 cm). In various embodiments, hot bulkhead panel holes 416 may vary in size.

Figure 5B:
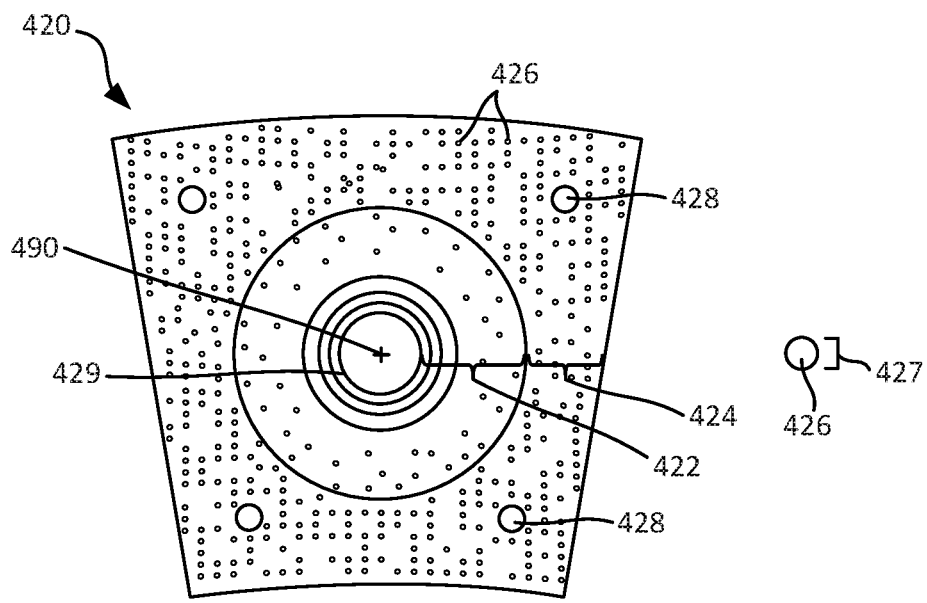
FIG. 5B illustrates a perspective view of a cold bulkhead panel of a combustor of a gas turbine engine, in accordance with various embodiments.

With combined reference to FIGS. 4, 5A, and 5B, cold bulkhead panel 420 may comprise stud holes 428 through which studs 452 may be disposed. Cold bulkhead panel 420 may comprise a cold panel radially inward portion 422 radially adjacent to cold bulkhead panel fuel hole 429, and a cold panel radially outward portion 424. Cold bulkhead panel 420 may comprise bulkhead cooling holes 426, the length of which may span through cold bulkhead panel 420 between the space between hot bulkhead panel 410 and cold bulkhead panel 420 and bulkhead dirt collecting space 442, substantially perpendicular to hot bulkhead panel 410 (as used in this context only "substantially" means within plus or minus 20% from perpendicular). Bulkhead cooling holes 426 may be disposed through any suitable portion of cold bulkhead panel 420. In various embodiments, there may be a greater number of bulkhead cooling holes 426 per unit of surface area comprising bulkhead cooling holes 426 through cold panel radially outward portion 424 than through cold panel radially inward portion 422, or vice versa. In various embodiments, there may be no bulkhead cooling holes 426 through cold panel radially inward portion 422 and/or cold panel radially outward portion 424. In various embodiments, bulkhead cooling holes 426 may have a diameter 427 of between 0.020 and 0.030 inch (0.05 and 0.08 cm), 0.023 and 0.027 inch (0.058 and 0.069 cm), 0.020 and 0.025 inch (0.05 and 0.06 cm), and/or 0.025 and 0.030 inch (0.06 and 0.08 cm). In various embodiments, bulkhead cooling holes 426 may vary in size.

In various embodiments, the length of bulkhead cooling holes 426 may be along a line different than hot bulkhead panel holes 416 such that bulkhead cooling holes 426 do not align with hot bulkhead panel holes 416 (i.e., bulkhead cooling holes 426 and hot bulkhead panel holes 416 are in misalignment). Therefore, any airflow (e.g., airflow 443) traveling through bulkhead cooling holes 426 may contact hot bulkhead panel 410, on which any dirt or particulate in the airflow may collect, before the airflow is redirected through hot bulkhead panel holes 416 to cool hot bulkhead panel 410 and/or combustion chamber 401. In various embodiments, hot bulkhead panel 410 may have substantially the same number of hot bulkhead panel holes 416 as cold bulkhead panel 420 has bulkhead cooling holes 426 (when used in this context only, "substantially" means within plus or minus 20% of the number of holes).

Figure 5C:
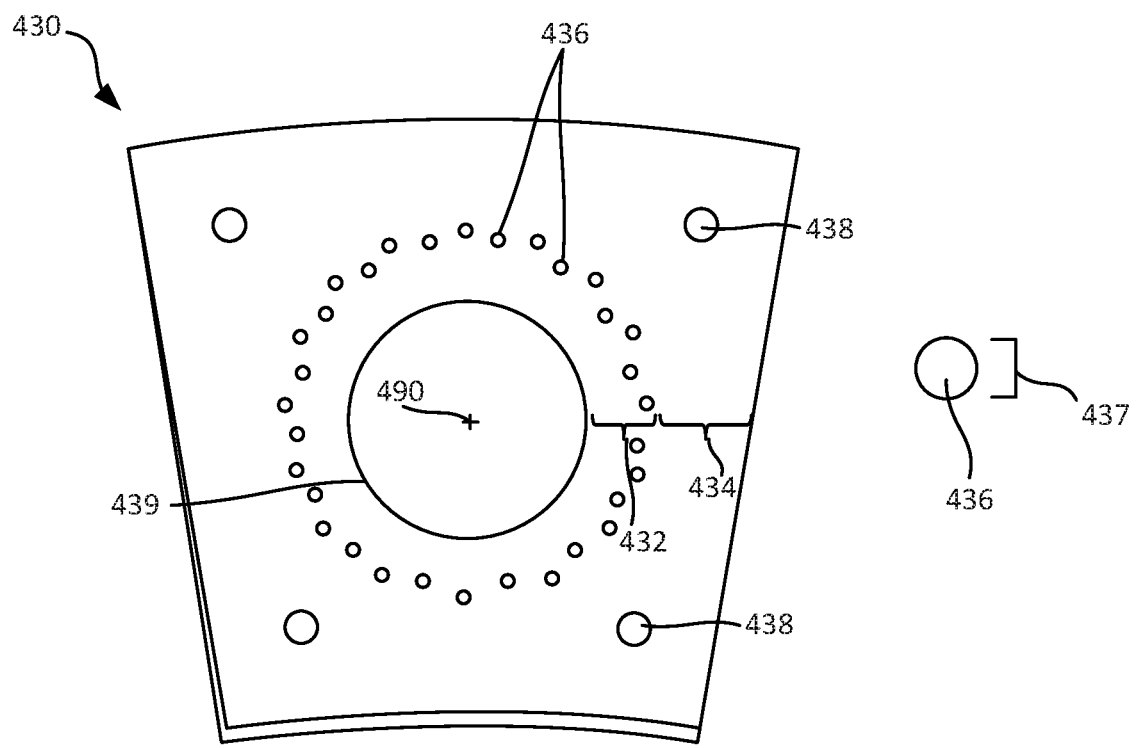
FIG. 5C illustrates a perspective view of a bulkhead dirt collector panel of a combustor of a gas turbine engine, in accordance with various embodiments.

With combined reference to FIGS. 4 and 5C, bulkhead dirt collector panel 430 may comprise stud holes 438 through which studs 452 may be disposed. Bulkhead dirt collector panel 430 may comprise a radially inward portion 432 radially adjacent to bulkhead dirt collector panel fuel hole 439, and an radially outward portion 434. Bulkhead dirt collector panel 430 may comprise dirt collector holes 436, the length of which may span through bulkhead dirt collector panel 430 between bulkhead dirt collecting space 442 and a space exterior to (i.e., forward of) bulkhead dirt collector panel 430, substantially perpendicular to cold bulkhead panel 420 (as used in this context only "substantially" means within plus or minus 20% from perpendicular). Dirt collector holes 436 may be disposed through any suitable portion of bulkhead dirt collector panel 430. In various embodiments, there may be a fewer number of dirt collector holes 436 per unit of surface area comprising dirt collector holes 436 through radially outward portion 434 than through radially inward portion 432, or vice versa. In various embodiments, there may be no dirt collector holes 436 on radially outward portion 434 and/or radially inward portion 432.

With combined reference to FIGS. 4 and 5A-5C, in embodiments in which bulkhead dirt collector panel 430 comprises more dirt collector holes 436 through radially inward portion 432 than radially outward portion 434, and cold bulkhead panel 420 comprises more bulkhead cooling holes 426 through cold panel radially outward portion 424 than cold panel radially inward portion 422, this disposition of dirt collector holes 436 and bulkhead cooling holes 426 minimizes the probability that airflow 440 flowing through dirt collector holes 436 will flow through dirt collector holes 436, through bulkhead dirt collecting space 442, and subsequently through bulkhead cooling holes 426 without first contacting the forward surface of cold bulkhead panel 420. Therefore, any particulate or dirt in airflow 440 may collect on cold bulkhead panel 420 in bulkhead dirt collecting space 442 before airflow 440 flows through bulkhead cooling holes 426. In furtherance of encouraging the collection of dirt from airflow 440 on cold bulkhead panel 420 after flowing through dirt collector holes 436, in various embodiments, the length of dirt collector holes 436 through bulkhead dirt collector panel 430 may be along a line different than bulkhead cooling holes 426 such that dirt collector holes 436 do not align with bulkhead cooling holes 426 (i.e., dirt collector holes 436 and bulkhead cooling holes 426 are in misalignment). Therefore, again, airflow 440 traveling through dirt collector holes 436 may contact cold bulkhead panel 420, on which any dirt or particulate in airflow 440 may collect, before airflow 440 is redirected in bulkhead dirt collecting space 442 (airflow 441, for example) to flow through bulkhead cooling holes 426 (the majority of which may be through cold panel radially outward portion 424, as shown by airflow 443) toward hot bulkhead panel 410 and/or combustion chamber 401.

In various embodiments, dirt collector holes 436 may have a diameter 437 larger than diameter 427 of bulkhead cooling holes 426 and/or diameter 417 of hot bulkhead panel holes 416. In various embodiments, dirt collector holes 436 may have a diameter of between 1 and 5 times, 1 and 4 times, 2 and 4 times, or 1 and 3 times the diameter of bulkhead cooling holes 426 and/or bulkhead panel holes 416. In various embodiments, diameter 437 of dirt collector holes 436 may be between 0.1 and 0.13 inch (0.25 and 0.33 cm), 0.1 and 0.15 inch (0.25 and 0.38 cm), 0.03 and 0.11 inch (0.08 and 0.28 cm), 0.05 and 0.11 inch (0.13 and 0.28 cm), and/or 0.08 and 0.11 inch (0.2 and 0.28 cm). In various embodiments, dirt collector holes 436 may vary in size. In various embodiments, bulkhead dirt collector panel 430 may have about 17% the number of dirt collector holes 436 as hot bulkhead panel 410 has hot bulkhead panel holes 416 and/or cold bulkhead panel 420 has bulkhead cooling holes 426 (when used in this context only, "about" means within plus or minus 10%). In various embodiments, the size of bulkhead dirt collecting space 442 may be half the size of diameter 437 or greater. In various embodiments, the size of bulkhead dirt collecting space 442 may be 2 times the size of diameter 437 or less. In various embodiments, the size of bulkhead dirt collecting space 442 may be between 0.5 and 2 times the size of diameter 437 (the size of bulkhead dirt collecting space 442 is referring to the distance between cold bulkhead panel 420 and bulkhead dirt collector panel 430).

In various embodiments, hot bulkhead panel holes 416, bulkhead cooling holes 426, and/or dirt collector holes 436 may not be circular, but may be any suitable shape such as oval, rectangular, square, hexagonal or the like. In such cases, the relative sizes of hot bulkhead panel holes 416, bulkhead cooling holes 426, and/or dirt collector holes 436 may be determined by a width, length, and/or height of the shape.

In various embodiments, a gas turbine engine may comprise a combustor having dirt collector system 260 (as shown and discussed in relation to FIGS. 2-3C) on the casing radially inward portion of the combustor casing and a dirt collector system 460 (as shown and discussed in relation to FIGS. 4-5C) on the casing forward portion of the combustor casing.

While this disclosure describes a dirt collector system comprised in a combustor of a gas turbine engine, it should be understood that the subject of this disclosure may be implemented in a combustor in any sort of engine (e.g., for another type of vehicle such as a boat, automobile, or the like), or on any other component of an engine through which airflow comprising undesired dirt or particulate may pass.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A combustor, comprising:
a combustion chamber encapsulated by a combustor casing, wherein the combustor casing comprises a casing forward portion, a casing radially inward portion, a casing radially outward portion, and a casing aft portion, wherein a radial direction is relative to an axis of rotation of a gas turbine engine,
wherein the casing radially inward portion comprises a dirt collector system, comprising:
a hot panel adjacent to the combustion chamber, wherein the hot panel is a panel of the dirt collector system closest to the combustion chamber within the combustor;
a cold shell panel coupled to the hot panel such that the hot panel is between the combustion chamber and the cold shell panel; and
a dirt collector panel coupled to the cold shell panel such that the cold shell panel is between the hot panel and the dirt collector panel, wherein the dirt collector panel is a single panel, and wherein the cold shell panel and the dirt collector panel at least partially define a dirt collecting space,
wherein the dirt collector panel comprises a plurality of dirt collector holes disposed through the dirt collector panel, wherein a forward portion of the dirt collector panel comprises a greater number of the plurality of dirt collector holes per unit of surface area than an aft portion of the dirt collector panel, wherein each dirt collector hole of the plurality of dirt collector holes spans a first length through the dirt collector panel substantially perpendicular to the cold shell panel such that an airflow may flow through the plurality of dirt collector holes, into the dirt collecting space, and contact a shell forward portion of the cold shell panel,
wherein the cold shell panel comprises a plurality of cooling holes disposed through both the shell forward portion and a shell aft portion of the cold shell panel, wherein the shell forward portion of the cold shell panel comprises a fewer number of the plurality of cooling holes per unit of surface area than the shell aft portion of the cooling shell panel, wherein the forward portion of the dirt collector panel is radially aligned with the shell forward portion of the cold shell panel.

2. The combustor of claim 1, wherein each of the plurality of cooling holes spans a second length substantially perpendicular to the hot panel such that the airflow may flow through the plurality of cooling holes and contact a hot panel aft portion of the hot panel.

3. The combustor of claim 2, wherein the first length of each dirt collector hole of the plurality of dirt collector holes spans along a different line than the second length of each of the plurality of cooling holes, such that the plurality of dirt collector holes and the plurality of cooling holes are in misalignment.

4. The combustor of claim 2, wherein each dirt collector hole of the plurality of dirt collector holes comprises a dirt collector hole diameter, wherein the dirt collecting space comprises a distance between the cold shell panel and the dirt collector panel, and wherein the distance of the dirt collecting space is a maximum of four times greater than the dirt collector hole diameter.

5. The combustor of claim 2, wherein each of the plurality of cooling holes comprises a cooling hole diameter, wherein each dirt collector hole of the plurality of dirt collector holes comprises a dirt collector hole diameter, and wherein each of the dirt collector hole diameters is larger than each of the cooling hole diameters.

6. The combustor of claim 5, wherein each of the dirt collector hole diameters is between one and five times larger than each of the cooling hole diameters.

7. The combustor of claim 2, wherein the hot panel comprises a hot panel hole through the hot panel aft portion of the hot panel, wherein the hot panel hole spans a third length through the hot panel.

8. The combustor of claim 7, wherein the second length of each of the plurality of cooling holes spans along a different line than the third length of the hot panel hole, such that the plurality of cooling holes and the hot panel hole are in misalignment.

9. A gas turbine engine, comprising:
a combustor comprising a combustion chamber encapsulated by a combustor casing, wherein the combustor casing comprises a casing forward portion, a casing radially inward portion, a casing radially outward portion, and a casing aft portion, wherein a radial direction is relative to an axis of rotation of the gas turbine engine,
wherein the casing radially inward portion comprises a dirt collector system, comprising:
a hot panel adjacent to the combustion chamber, wherein the hot panel is a panel of the dirt collector system closest to the combustion chamber within the combustor;
a cold shell panel coupled to the hot panel such that the hot panel is between the combustion chamber and the cold shell panel; and
a dirt collector panel coupled to the cold shell panel such that the cold shell panel is between the hot panel and the dirt collector panel, wherein the dirt collector panel is a single panel, and wherein the cold shell panel and the dirt collector panel at least partially define a dirt collecting space,
wherein the dirt collector panel comprises a plurality of dirt collector holes disposed through the dirt collector panel, wherein a forward portion of the dirt collector panel comprises a greater number of the plurality of dirt collector holes per unit of surface area than an aft portion of the dirt collector panel, wherein each dirt collector hole of the plurality of dirt collector holes spans a first length substantially perpendicular to the cold shell panel such that an airflow may flow through the plurality of dirt collector holes, into the dirt collecting space, and contact a shell forward portion of the cold shell panel, and
wherein the cold shell panel comprises a plurality of cooling holes through both the shell forward portion and a shell aft portion of the cold shell panel, wherein the shell forward portion of the cold shell panel comprises a fewer number of the plurality of cooling holes per unit of surface area than the shell aft portion of the cooling shell panel, wherein the forward portion of the dirt collector panel is radially aligned with the shell forward portion of the cold shell panel.

10. The gas turbine engine of claim 9, wherein the first length of each of the plurality of dirt collector holes spans along a different line than a second length of each of the plurality of cooling holes, such that the plurality of dirt collector holes and the plurality of cooling holes are in misalignment.

* * * * *

UNITED STATES PATENT AND TRADEMARK OFFICE
CERTIFICATE OF CORRECTION

PATENT NO. : 11,187,413 B2
APPLICATION NO. : 15/697219
DATED : November 30, 2021
INVENTOR(S) : Carey Clum et al.

Page 1 of 1

It is certified that error appears in the above-identified patent and that said Letters Patent is hereby corrected as shown below:

On the Title Page

Item (54) and in the Specification Column 1, Line 1, at the end of the Title after DIRT COLLECTOR SYSTEM, please insert -- FOR A COMBUSTOR OF A GAS TURBINE ENGINE --

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*